United States Patent [19]

Shedroff

[11] 4,428,780

[45] Jan. 31, 1984

[54] SOLUTIONS FOR USE IN BONDING PLATES OF STORAGE BATTERIES TO CONNECTING SYSTEMS

[75] Inventor: Theodore L. Shedroff, Morton Grove, Ill.

[73] Assignee: Lake Chemical Co., Chicago, Ill.

[21] Appl. No.: 464,747

[22] Filed: Feb. 7, 1983

[51] Int. Cl.³ .............................................. B23K 35/34
[52] U.S. Cl. ...................................... 148/23; 148/24; 148/25
[58] Field of Search ..................................... 148/23–25

[56] References Cited

U.S. PATENT DOCUMENTS

| | | | |
|---|---|---|---|
| 3,832,242 | 8/1974 | Cuthbert | 148/25 |
| 3,837,932 | 9/1974 | Aronberg | 148/23 |
| 3,895,973 | 7/1975 | Stayner | 148/25 |
| 3,944,123 | 3/1976 | Jacobs | 148/25 |
| 4,113,525 | 9/1978 | Stayner | 148/23 |
| 4,140,554 | 2/1979 | Stayner | 148/23 |
| 4,168,996 | 9/1979 | Zado | 148/23 |
| 4,216,035 | 8/1980 | Bakos | 148/23 |
| 4,278,477 | 7/1981 | Anderson | 148/23 |
| 4,342,607 | 8/1982 | Zado | 148/25 |

*Primary Examiner*—Peter D. Rosenberg
*Attorney, Agent, or Firm*—Sidney Wallenstein

[57] ABSTRACT

A flux, in the form of a substantially clear solution, having particular utility in soldering battery components, said flux consisting essentially of a water-soluble alkanolamine, a substantially water-insoluble polycarboxylic acid which is partially or fully neutralized by said alkanolamine, and water.

10 Claims, No Drawings

SOLUTIONS FOR USE IN BONDING PLATES OF STORAGE BATTERIES TO CONNECTING SYSTEMS

BACKGROUND OF THE INVENTION

This invention relates to fluxes, in the form of aqueous solutions, for use in soldering and finds particular utility as a flux for use in forming a strong and durable bond between the lugs of the positive and negative plates, or grids, of a lead storage battery, and the terminal post-bearing connecting straps of the battery. It is an improvement particularly over the flux compositions which are disclosed in U.S. Pat. No. 3,837,932.

As set forth in said U.S. Pat. No. 3,837,932, owned by the assignee of the present invention, assembly of the cells of a lead storage battery of the type used in automotive vehicles involves bonding the lugs of the plates, or grids, which comprise the cells of the battery, to terminal post-bearing connecting straps. The plates, or grids, and the connecting straps are typically formed of lead alloyed with minor amounts, typically from about 3 to about 6 percent of antimony, and it is important that the bond formed between the lugs of the plates, or grids, and the connecting straps be strong, since, otherwise the operation and the useful life of the battery will be adversely affected. Generally speaking, procedures used in attaining a bond require the use of heat to bring about a fusion of the metal of the lugs with the metal of the connecting straps. One such procedure involves preheating the lugs of the plates, or grids, to a temperature of approximately 450° F., and contacting the preheated lugs with the metal of the connecting straps held in a mold in a molten condition at a temperature of approximately 925° F. A flux is customarily applied to the lugs prior to contacting them with the molten metal in the connecting strap molds.

In the aforementioned U.S. Pat. No. 3,837,932, the shortcomings of prior soldering fluxes were discussed with particular attention to the soldering of lead battery connecting straps. Fluxes such as aqueous solutions of zinc chloride and tin chloride, and mixtures thereof, with or without acids, such as hydrochloric acid, were found unsuitable due to their corrosive properties, and tendency to form oxides. Use of such fluxes resulted in weakened solder bonds, making the resulting battery assemblies unreliable and subject to premature failure.

As is disclosed in said U.S. Pat. No. 3,837,932, improved fluxes over those previously known to the then prior art were evolved which involved the use of substantially water-insoluble polycarboxylic acids in the form of aqueous suspensions or dispersions, advantageously in conjunction with binders such as gums or polyvinylpyrrolidone, or, in place of water for the preparation of such suspensions or dispersions, although less advantageously, other carriers are shown such as alcohols or ethers, illustrative examples of which disclosed are ethanol, isopropanol, hexanol, glycerol, cellosolves, and the like. Furthermore, as shown in said patent, although also less advantageously, the binder can be eliminated and the dry powdered substantially water-insoluble polycarboxylic acid can be used alone by spraying the dry powdered substantially water-insoluble polycarboxylic acid onto the surfaces of the lugs, preferably after the preheating of the lugs.

While the flux compositions of said U.S. Pat. No. 3,837,932 constituted a distinct improvement over previously known or suggested fluxes for the particular use referred to above and in said patent, they still presented certain disadvantages from the standpoints of ease and effectiveness of use.

Soldering fluxes are also known to the art, as shown in U.S. Pat. No. 4,194,931, which comprise mixtures of rosin; certain activators, such as halogenated mono- and di-carboxylic acids, containing at least one halogen atom and at least one destabilizing substituent, as, for example, halogenated succinic acid, halogenated adipic acid and 2-bromosuccinic acid; solder surfactants comprising polycarboxylic acids having from 4 to 10 carbon atoms including, for instance, tartaric acid and citric acid; and a solvent among which are mentioned aliphatic alcohols such as methanol, ethanol, isopropanol; alkanolamines such as monoethanolamine and diethanolamine; chlorinated hydrocarbons such as perchloroethylene, trichloroethylene, etc. The patent points out and stresses that the combination of the halogen substituted activator and said solder surfactant yield unexpected and surprising synergism in the flux which employs the rosin. Apart from other considerations, the flux compositions of said U.S. Pat. No. 4,194,931 are radically different from the clear flux solutions of my present invention in composition and do not in any way remotely suggest the particular flux compositions of my present invention.

It has also been known to the art, as shown in U.S. Pat. No. 2,445,431, to prepare resin fluxes which are produced by reacting an organic dibasic acid such as maleic acid, succinic acid, adipic acid, or other polybasic acids, with substantially molar equivalents of polyhydric alcohols such as glycerol, propylene glycol, mannitol or other polyhydric alcohols to cause initial resinification, and further reacting, for example, by heating, to produce a resinous flux having an acid number of less than 50. Such fluxes are radically different from and unrelated to the particular fluxes of my present invention. The same is true with respect to the heretofore suggested fluxes shown in U.S. Pat. Nos. 4,168,996; 4,218,248; and 4,243,440 which utilize, as one of the ingredients thereof, polycarboxylic acids, rosin, organic solvents which include, among others, methanol, ethanol, alkanolamines such as monoethanolamine or diethanolamine, and chlorinated hydrocarbons; metal-joining pastes which include as ingredients thereof fluxes such as rosin, or fluxes containing monobasic or polybasic carboxylic acids such as citric acid, lauric acid, adipic acid, fumaric acid, alkanolamines and alkanolamine hydrohalides, boric acid, surface active agents, and metal powders; and esters of polyhydric alcohols with saturated fatty acids, esters of polyhydric alcohols with unsaturated fatty acids and esters of polyhydric alcohols with monocarboxylic aromatic acids; and wetting agents in the form of aliphatic or aromatic mono- or polycarboxylic acids such as stearic acid, adipic acid, sebacic acid and linoleic acid or long chain dicarboxylic acids, which also act as fluxes as well as antioxidants. The compositions of said three last-mentioned patents are radically different from those of my present invention and do not in any way suggest my invention.

Finally, it may be noted that it has also heretofore long been suggested in the art, as shown in U.S. Pat. No. 1,785,134, to utilize hydroxy-alkyl amines, such as monoethanolamine and diethanolamine, as such, as soldering fluxes in place of zinc chloride or zinc chloride in admixture with rosin; but hydroxy-alkyl amines, as such, are of little or no practical value for use as fluxes for the particular purposes of the present invention, namely, in connection with forming a strong and durable bond between the lugs of the positive and negative plates, or grids, of a lead storage battery, and the terminal post-bearing straps of the battery.

SUMMARY OF THE INVENTION

In accordance with my present invention, while substantially water-insoluble polycarboxylic acids are utilized, they are employed in the form of solutions, which are generally clear solutions to the naked eye, in water-soluble hydroxy-alkyl amines or alkanolamines and water. In accordance with especially preferred embodiments of my present invention, the water content of the flux solutions is present in proportions in excess of that of the substantially water-insoluble polycarboxylic acid, and said polycarboxylic acid is present in excess of the water-soluble hydroxy-alkyl amine or alkanolamine.

The substantially water-insoluble polycarboxylic acids used in the production of the clear flux solutions of my present invention can be those which are disclosed in the aforesaid U.S. Pat. No. 3,837,932, namely, those having from 2 to 4 carboxylic groups and which, as there disclosed, are characterized in that they will not sublime, or will not manifest substantial sublimation, at the temperatures employed in bonding the lugs of battery plates, or grids, to the connecting straps. As indicated hereinabove, these temperatures are of an order of 900° F., more or less. Exemplary of substantially water-insoluble organic polycarboxylic acids which meet the aforementioned desiderata are aliphatic hydrocarbon dicarboxylic acids such as adipic acid and azelaic acid; aromatic dicarboxylic acids, specific examples of which are uvitic acid, isouvitic acid, and homophthalic acid; aromatic polycarboxylic acids exemplified by pyromellitic acid; and the like. It will be understood that mixtures of two or more of said substantially water-insoluble polycarboxylic acids can be utilized but, generally, no functional advantage is achieved thereby. Of the foregoing acids, adipic acid is outstandingly effective.

While numerous water-soluble hydroxy-alkyl amines or alkanolamines may be used to neutralize the substantially water-insoluble polycarboxylic acids utilized, the mono-, di-, and triethanolamines have been found to be very satisfactory with monoethanolamine being particularly useful. Illustrative other water-soluble hydroxy-alkyl amines or alkanolamines which, per se, are well-known to the art, and which can effectively be utilized are propanolamines, isopropanolamines, hydroxyethylethanolamines, glycerolamines, as well as many others. As noted above, monoethanolamines and commercial sources thereof are, generally, most preferred. It will be understood, of course, that mixtures of two or more hydroxy-alkyl amines and/or alkanolamines can be used although usually no particular advantage from a functional standpoint is achieved thereby.

DETAILED DESCRIPTION OF THE INVENTION

Consistent with the foregoing descriptions, fluxes as prepared according to the present invention are advantageously used in the form of clear aqueous solutions consisting essentially of an organic substantially water-insoluble polycarboxylic acid, and an alkanolamine. While the ratios of the individual constituents can be varied over a substantial range, it is most desirable, as indicated above, that the water exceed the amount of the water-insoluble polycarboxylic acid and that said polycarboxylic acid exceed the amount of the hydroxy-alkyl amine or the alkanolamine. In any event, the finished flux solution should be clear to the naked eye. It has been found that such results are achievable even though a portion of the polycarboxylic acid utilized remains free, or unneutralized, or is not converted to the water-soluble salt formed by the polycarboxylic acid and the alkanolamine selected. Such proportions of unneutralized or free water-insoluble polycarboxylic acids may be as high as 30 or 40% or more without disturbing the clarity of the solution and, indeed, such compositions constitute preferred embodiments of the invention. In other words, in such solutions the alkanolamine is present in sufficient proportions to neutralize about 60 to about 70% of said polycarboxylic acid. While the water-soluble alkanolamine can be used in proportions to exceed the amount of water-insoluble polycarboxylic acid necessary fully to neutralize the latter in the aqueous solution, no particular advantage is achieved thereby and it is unnecessary to do so and, as noted, it is particularly advantageous to use amounts less than that which is otherwise necessary to neutralize even all of the water-insoluble polycarboxylic acid which is used in the compositions without impairing clarity.

A preferred manner in which to practice the present invention, as noted above, utilizes adipic acid, monoethanolamine and water. Water is present in amounts ranging from about 40% to about 60%, by weight, while adipic acid is present in amounts ranging from about 25% to about 40% by weight, and monoethanolamine is present in amounts ranging from about 15% to about 25% by weight. Within these ranges, one can generally achieve clear solutions suitable for fluxing operations contemplated by the present invention. If desired, although optional, surface active agents, can be included in the compositions in small proportions, generally 0.1 to 0.5% by weight. In such cases, it is generally preferred to use any of the well-known nonionic surface active agents, there being nothing critical in the selection thereof. "Triton X-100" (Rohm & Haas Company) is typical of such surface active agents.

Illustrative formulations, representing the best embodiments of the invention, are shown in the following examples and feature the foregoing compounds in which the ingredients are shown in the following percentages by weight:

| Example 1: | |
|---|---|
| Water | 42% |
| Adipic Acid | 38% |
| Monoethanolamine | 20% |
| Example 2: | |
| Water | 58% |
| Adipic Acid | 26.5% |
| Monoethanolamine | 15% |
| Triton X-100 | 0.5% |
| Example 3: | |
| Water | 56% |
| Adipic Acid | 25% |
| Monoisopropanolamine | 19% |

While the foregoing flux compositions, in their particularly preferred use, are employed in the manner described in the aforesaid U.S. Pat. No. 3,837,932, it is to be understood that such flux compositions are presented by way of example only and are not intended to limit the scope of the invention. In addition, it should be mentioned that the flux compositions may, under certain conditions, contain water in an amount such that the active ingredients, that is, the alkanolamine and the polycarboxylic acid, will comprise only about 10%, by weight, of the composition without any appreciable lessening of the capability of the composition to function as a flux. Given the above teachings and illustrative examples thereof, it will be apparent that various other flux compositions can readily be prepared in light of the guiding principles and teachings provided herein without departing from the spirit and scope of the invention as herein described and claimed.

The term "alkanolamine", as employed in the claims, is used to include and encompasses hydroxy-alkyl amines.

I claim:

1. A flux having particular application in forming a soldered bond between the lugs of the plates of a lead storage battery and the connecting straps of said plates, said flux consisting essentially of a substantially clear solution in the form of an aqueous solution of a salt formed by a substantially water-insoluble polycarboxylic acid and a water-soluble alkanolamine.

2. A flux according to claim 1 wherein said alkanolamine is present in sufficient proportion to substantially completely neutralize said polycarboxylic acid.

3. A flux according to claim 1 wherein said alkanolamine is present in sufficient proportion to neutralize about 60% to about 70% of said polycarboxylic acid.

4. A flux according to claim 1 wherein said polycarboxylic acid comprises from about 25% to about 40%, by weight, of said flux.

5. A flux according to claim 1 wherein said polycarboxylic acid is adipic acid.

6. A flux according to claim 3 wherein said polycarboxylic acid is adipic acid.

7. A flux according to claim 3 wherein said alkanolamine is monoethanolamine.

8. A flux having particular application in forming a soldered bond between the lugs of the plates of a lead storage battery and the connecting straps of said plates, said flux consisting essentially of a substantially clear solution of adipic acid, monoethanolamine and water, said adipic acid being present in proportions of about 25 to about 40%, by weight, and said monoethanolamine being present in sufficient proportion to form a substantially clear solution with said adipic acid in said water medium.

9. A flux according to claim 8 wherein said monoethanolamine is present in sufficient proportion to completely neutralize said adipic acid.

10. A flux according to claim 8 wherein said monoethanolamine is present in sufficient proportion to neutralize about 60% to about 70% of said adipic acid.

* * * * *